United States Patent
Ohta et al.

(10) Patent No.: US 8,186,228 B2
(45) Date of Patent: May 29, 2012

(54) STRAIN MEASURING DEVICE

(75) Inventors: Hiroyuki Ohta, Tsuchiura (JP); Hiromi Shimazu, Kashiwa (JP); Yohei Tanno, Hitachinaka (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 13/024,368

(22) Filed: Feb. 10, 2011

(65) Prior Publication Data

US 2011/0128113 A1 Jun. 2, 2011

Related U.S. Application Data

(62) Division of application No. 11/844,374, filed on Aug. 24, 2007, now Pat. No. 7,893,810.

(30) Foreign Application Priority Data

Sep. 28, 2006 (JP) ................................. 2006-263721

(51) Int. Cl.
*G01L 1/00* (2006.01)

(52) U.S. Cl. .......................................................... 73/777

(58) Field of Classification Search ...................... 73/777
See application file for complete search history.

(56) References Cited

U.S. PATENT DOCUMENTS

| | | | |
|---|---|---|---|
| 3,965,453 A | 6/1976 | Seidel et al. | |
| 4,287,772 A * | 9/1981 | Mounteer et al. | 73/720 |
| 4,373,399 A | 2/1983 | Beloglazov et al. | |
| 4,404,539 A | 9/1983 | Yamada et al. | |
| 4,462,018 A * | 7/1984 | Yang et al. | 338/3 |
| 4,904,978 A * | 2/1990 | Barth et al. | 338/47 |
| 4,986,131 A | 1/1991 | Sugiyama et al. | |
| 5,631,622 A * | 5/1997 | Hauber et al. | 338/2 |
| 6,341,528 B1 * | 1/2002 | Hoffman et al. | 73/777 |
| 7,002,227 B2 * | 2/2006 | Toyoda et al. | 257/417 |
| 7,215,870 B2 * | 5/2007 | Ziebart et al. | 385/147 |
| 7,484,422 B2 | 2/2009 | Sumigawa et al. | |
| 7,893,810 B2 * | 2/2011 | Ohta et al. | 338/2 |

FOREIGN PATENT DOCUMENTS

JP 2005-114443 4/2005
JP 2006-003182 1/2006

* cited by examiner

*Primary Examiner* — Lisa Caputo
*Assistant Examiner* — Octavia Davis-Hollington
(74) *Attorney, Agent, or Firm* — Antonelli, Terry, Stout & Kraus, LLP.

(57) ABSTRACT

A strain measuring device includes a bridge circuit comprising a p-type impurity diffused resistor as a strain detecting portion and a bridge circuit comprising an n-type impurity diffused resistor as a strain detecting portion in a semiconductor single crystalline substrate, Sheet resistance of the p-type impurity diffused resistor is 1.67 to 5 times higher than that of the n-type impurity diffused resistor. Furthermore, the impurity diffused resistor is configured to be a meander shape including strip lines and connecting portions.

5 Claims, 13 Drawing Sheets

STRAIN MEASURING DEVICE

CROSS-REFERENCE TO RELATED APPLICATIONS

The application is a divisional application of U.S. application Ser. No. 11/844,374, filed Aug. 24, 2007, now U.S. Pat. No. 7,893,810 and which application claims priority from Japanese application serial No. 2006-263721 filed on Sep. 28, 2006, the contents of which are hereby incorporated by reference into this application.

BACKGROUND OF THE INVENTION

1. Field of the Invention

The present invention relates to a strain measuring device and a system that can measure strain.

2. Description of Related Art

So far, a semiconductor single crystalline substrate comprising local impurity diffused resistors is known as a mechanical quantity measuring device. As described in JP-A-2006-003182, there is a method to measure strain of an object by attaching this mechanical quantity measuring device to the object, based on change of the resistance of the impurity diffused resistors caused by the strain. In this method, four impurity diffused resistors through which current can flow in a specific direction are used to form a Wheatstone bridged circuit (hereafter, referred to as a bridged circuit) so as to measure strain in a specific direction of the substrate by utilizing anisotropy of the crystal orientation in strain sensitivity of the impurity diffused resistor. Furthermore, as described in FIG. 18 of JP-A-2006-003182, it is also proposed that each impurity diffused resistor is configured to a meander shaped strip line by being connected plural strip lines by a contact and/or a wiring in order to reduce power consumption of the mechanical quantity measuring device.

In the above related art, however, there is a possibility of decreasing measurement accuracy due to offset or fluctuation of sensitivity resulting from the variability of sheet resistance of p-type impurity diffused resistors in especial.

SUMMARY OF THE INVENTION

Under these circumstances, it is an object of a preferred embodiment of the present invention to provide a strain measuring device, which can perform highly accurate measurement.

An aspect of the present invention is to make sheet resistance value of a p-type impurity diffused resistor higher than that of an n-type impurity diffused resistor. Another aspect of the present invention is to make the number of strip lines that configure a meander shape of the p-type impurity diffused resistor smaller than that of the n-type impurity diffused resistor. Another aspect of the present invention is to make two impurity diffused resistors, which constitute a pair of opposite arms of a bridged circuit, be adjacent to each other. Another aspect of the present invention is to make an interval among each strip lines configuring a meander shape of the impurity diffused resistor be the same as that between two impurity diffused resistors, which constitute a pair of opposite arms of a bridged circuit.

ADVANTAGES OF THE INVENTION

According to the present invention, it is possible to provide a strain measuring device that has a small variability of the sheet resistance of p-type impurity diffused resistors. Furthermore, it is possible to provide a strain measuring device that has a small offset of the bridged circuit. Thus, highly accurate measurement of a strain can be carried out. Furthermore, because the fluctuation of sensitivity decreases, an accurately measured value can be obtained even when measurement is performed to separate biaxial strain.

DETAILED DESCRIPTION OF THE PREFERRED EMBODIMENTS

Preferred embodiments of the present invention will be described bellow with reference to the drawings. However, the present invention is not limited to the embodiments described herein.

In the present invention, the strain detective portion is configured as a bridged circuit comprising impurity diffused resistors in the surface region of a semiconductor single crystalline substrate. And it is designed by considering the relation between the crystal orientation of a semiconductor single crystal and the piezoresistance coefficient according to the crystal orientation so that desired characteristics can be obtained based on the relation between the direction of current flow along the impurity diffused resistors and the strain measuring direction. Furthermore, as a semiconductor single crystalline substrate, it is preferable to use a material that has a cubic structure such as silicon. Hereafter, Miller's index is used for the notation of a crystal plane and a crystal orientation of the semiconductor single crystalline substrate.

In accordance with Miller's index notation, when specifying a minus direction, a bar is usually assigned above the number. However, in this specification, the number to which a bar is to be assigned is expressed with "–" such as [–110]. Furthermore, when representing a specific plane and direction, parentheses ( ) and square brackets [ ] are used, respectively. And, when representing a plane and direction that is equivalent in the crystal structure, braces { } and angle brackets < > are used, respectively. Furthermore, in this specification, current flows in the longitudinal direction of the impurity diffused resistor and changes of the resistance value in the current direction are measured. In other words, the expression "longitudinal direction of resistance" means the direction in which current flows and changes of the resistance value are measured.

First Embodiment

Figure 1:
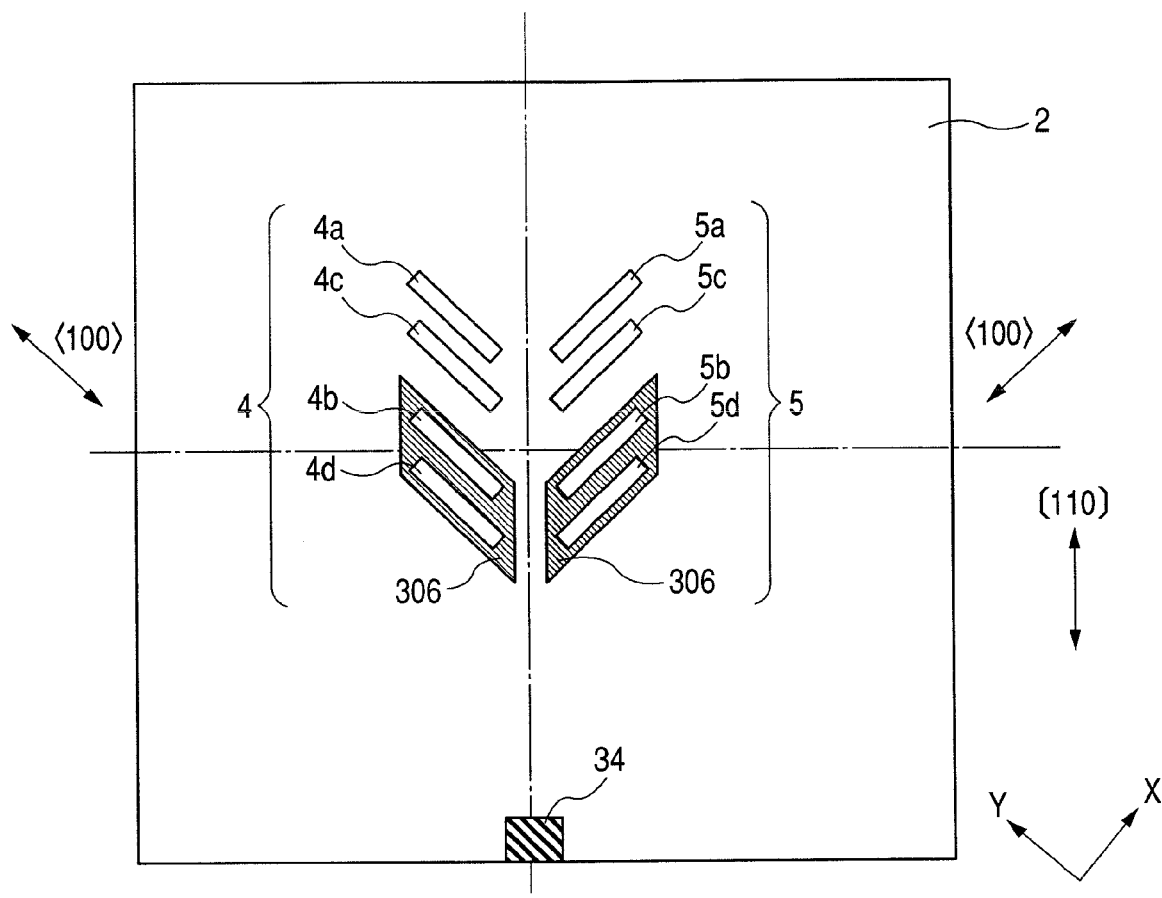
FIG. 1 is a schematic illustration showing a basic relationship between the impurity diffused resistors and the semiconductor single crystalline substrate in a first embodiment of the present invention.
Figure 2:
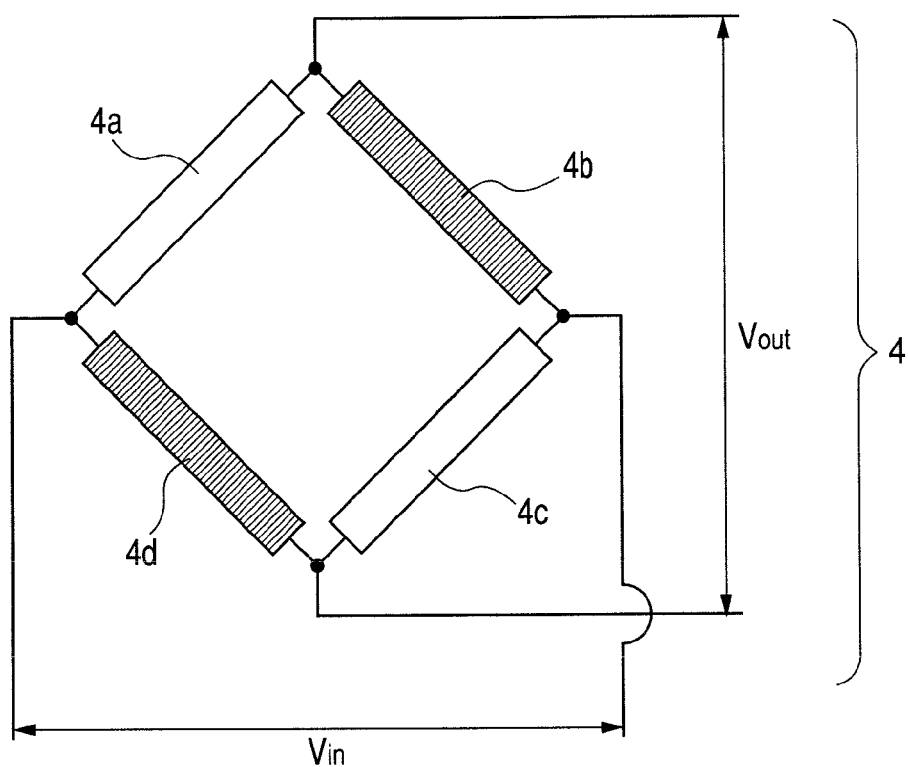
FIG. 2 is a schematic illustration showing a connection of a bridged circuit in order to explain a principle of the present invention.

FIG. 1 is a schematic illustration showing a basic relationship between the impurity diffused resistors and the semiconductor single crystalline substrate in a first embodiment of the present invention; and FIG. 2 is a schematic illustration showing a connection of a bridged circuit in order to explain a principle of the present invention. As shown in FIG. 1, it is possible to measure a multiaxial strain by using bridged circuits 4 and 5 formed in one semiconductor single crystalline substrate 2. The bridged circuit 4 comprises p-type impurity diffused resistors (4b and 4d) formed in p-type well 306 and n-type impurity diffused resistors (4a and 4c), and the bridged circuit 5 comprises p-type impurity diffused resistors (5b and 5d) formed in p-type well 306 and n-type impurity diffused resistors (5a and 5c). In this embodiment, each impurity diffused resistor is configured so that longitudinal direction of the resistor is parallel to <100> direction of the semiconductor single crystalline substrate 2 along which current flows. A marker 34 may be formed on the semiconductor single crystalline substrate 2 to identify the crystal orientation of the substrate.

The impurity diffused resistors of the bridged circuit 4 are connected so that the p-type impurity diffused resistors 4b and 4d constitute a pair of opposite arms of a bridged circuit, and that the n-type impurity diffused resistors 4a and 4c constitute the other pair of opposite arms, as shown in FIG. 2. In the same manner, the impurity diffused resistors of the bridged circuit 5 are also connected. Among those resistors, the p-type impurity diffused resistors 4b, 4d, 5b and 5d have very low sensitivity to strain in any direction, while n-type impurity diffused resistors 4a, 4c, 5a and 5c have high sensitivity to strain in the current direction and also have some sensitivity to strain in the direction perpendicular to the current direction. Accordingly, forming bridged circuits 4 and 5 on one semiconductor single crystalline substrate makes it possible to detect mainly strain of the <100> direction of the substrate, which is the current direction.

Figure 3:
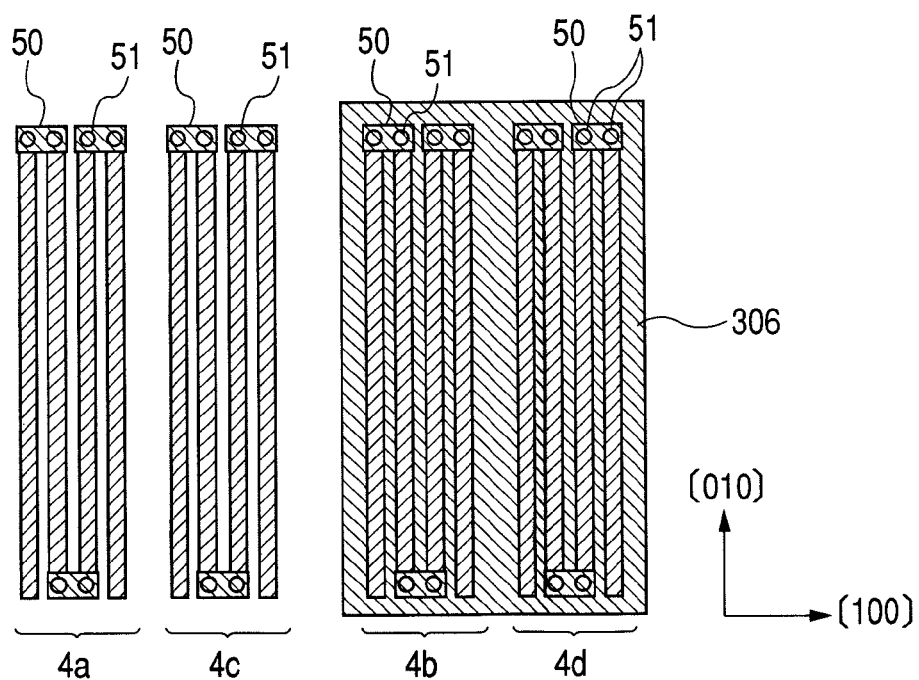
FIG. 3 is a schematic illustration showing an example of the meander shaped resistors comprising strip lines and u-turn portions in a first embodiment of the present invention.
Figure 4:
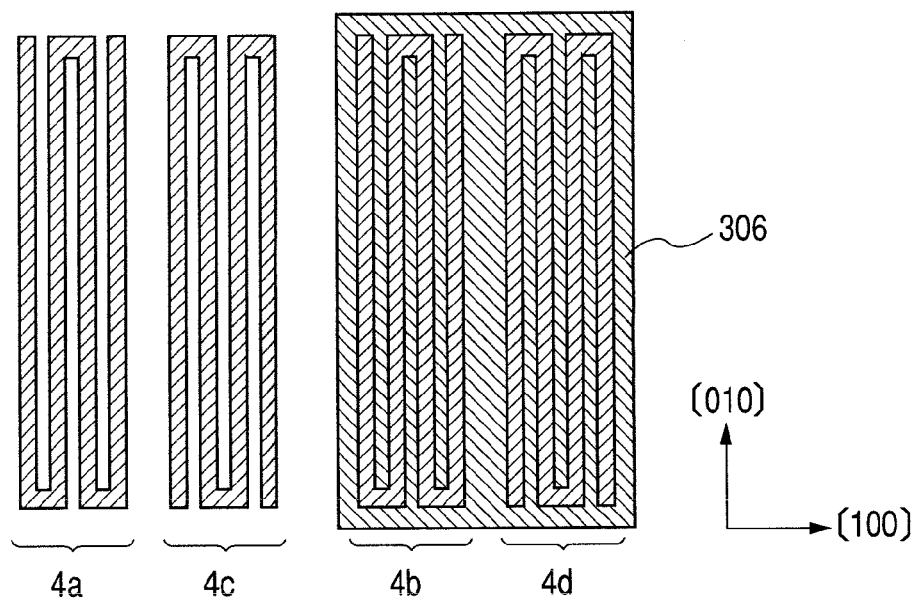
FIG. 4 is a schematic illustration showing another example of the meander shaped impurity diffused resistors in a first embodiment of the present invention.

Moreover, it is desirable that each impurity diffused resistor has high resistance in order to reduce power consumption. Therefor, as shown in FIG. 3, a method can be chosen in which each of impurity diffused resistors 4a, 4b, 4c and 4d is provided by connecting plural strip lines using contact holes 51 and wires 50 as u-turn portions in order to gain sufficient length of the resistor, thereby increasing the resistance value. Alternatively, as shown in FIG. 4, instead of using contact holes and wires, a method in which each impurity diffused resistor itself turns back to configure a meander shape can be utilized to obtain the same effect. Hereafter, it is defined that a meander shaped resistor comprises strip lines and connecting portions as u-turn portions.

In the conventional art, an actual sheet resistance value of the p-type impurity diffused resistor (e.g., 4b or 4d) often differs from a nominal value predetermined during the production process for each wafer and lot; consequently, the final resistance value is different from the value presumed when the circuit pattern was designed. That leads an imbalance in the bridged circuit because the resistance value of the p-type impurity diffused resistor (e.g., 4b or 4d) is different from that of the n-type impurity diffused resistor (e.g., 4a or 4c), which in some cases results in the occurrence of a large offset. Furthermore, when an amplifier amplifies this output of the bridged circuit, there is a problem in that amplified output becomes saturated due to the offset; as a result, high power amplification is not possible, which in some cases hinders highly accurate measurement.

As the results of detail studies on the p-type impurity diffused resistor by the inventors, it is found that the dispersion of sheet resistance of the p-type impurity diffused resistors in the above strain measuring device is caused from the diffusion behavior of the boron atom which is a p-type impurity. That is, the p-type impurity like boron atom diffuses in a semiconductor crystal significantly faster than the n-type impurity; therefore, it tends to deviate from desired distribution of the p-type impurity. Furthermore, since the boron atom has an interstitial diffusion mechanism in a semiconductor crystal, diffused atoms are easily trapped in the strain field of the crystal. When ion implantation with a high concentration is executed, this phenomenon becomes conspicuous because a strain field is created as the result of the mixing of different types of atoms due to the ion implantation. Furthermore, when a semiconductor single crystalline substrate contains large quantities of microdefects, the dispersion of p-type impurities further increases due to the atoms being trapped in those microdefects.

That is, diffused boron atoms tend to be trapped in the strain concentration field, such as a corner of the diffusion pattern or a contact portion; and the strain increases with increasing the quantity of ion implantation, i.e., with decreasing the sheet resistance. The degree of strain concentration is easy to differ for each lot or wafer. Slight mismatch of the pattern or an irregular shape of the impurity diffused resistor in the surface of a wafer also changes the strain concentration. Therefore, it was clarified that the quantity of boron atoms being trapped tends to change significantly, and that the change affects the variability of the resistance value.

Figure 5:
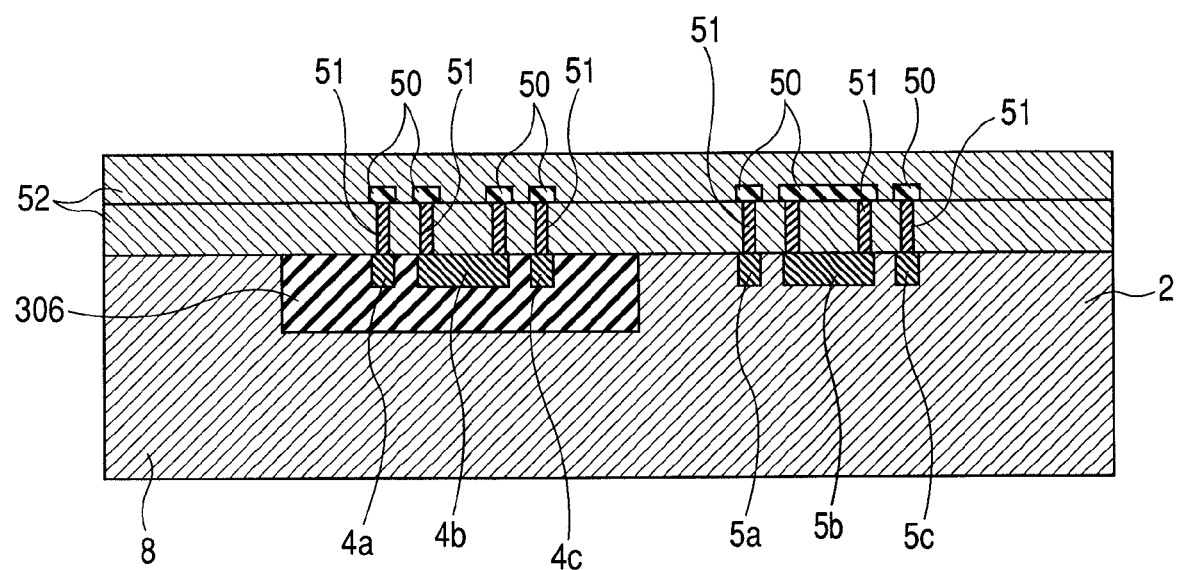
FIG. 5 is a schematic illustration showing a cross-sectional view of a strain measuring device in the present invention.

FIG. 5 is a schematic illustration showing a cross-sectional view of a strain measuring device in the present invention. Impurity diffused resistors 4a to 4d and 5a to 5d are formed in the surface region of a silicon substrate 2; a contact hole 51 is connected to each impurity diffused resistor; and a wire 50 is disposed at an end portion of the contact hole 51. The contact hole 51 and the wire 50 are embedded in an interlayer insulation film 52.

Figure 6:
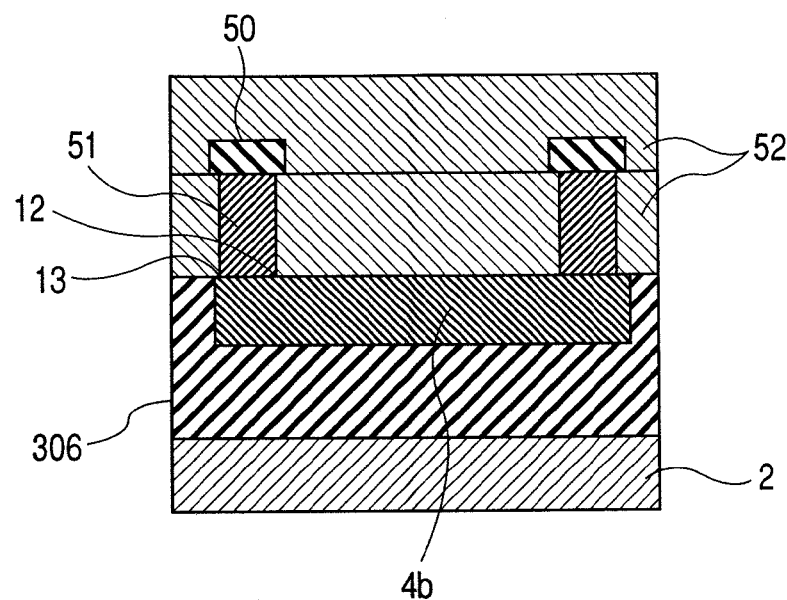
FIG. 6 is a schematic illustration showing a partially enlarged cross-sectional view of FIG. 5.
Figure 7:
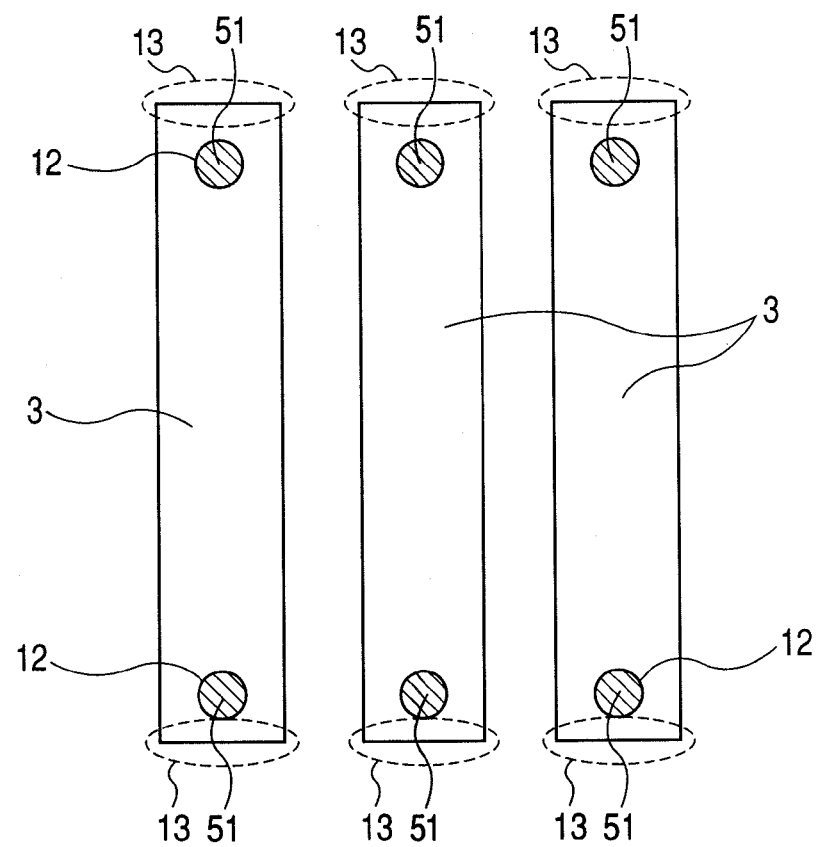
FIG. 7 is a schematic illustration showing a partially enlarged plan view of the impurity diffused resistors of a strain measuring device in the present invention.

FIG. 6 is a schematic illustration showing a partially enlarged cross-sectional view of FIG. 5; and FIG. 7 is a schematic illustration showing a partially enlarged plan view of the impurity diffused resistors of a strain measuring device in the present invention. As mentioned above, it is found that strain easily concentrates in a edge portion 13 of each impurity diffused resistor or at a boundary surface 12 adjacent to the contact hole 51 shown in FIGS. 6 and 7; and boron atoms are easily trapped in those locations. This is because, at the boundary surface 12 adjacent to the contact hole 51 or in the edge portion 13, the local strain value easily fluctuates due to mismatch of the pattern and machining error, or the like. This affects the quantity of trapped atoms, resulting in the variability of the sheet resistance value.

Since the distribution of boron atoms constituting p-type impurity diffused resistors fluctuates due to the above-mentioned reasons, it was revealed that the sheet resistance of the impurity diffused resistors greatly varies.

Therefore, in the present invention, a strain measuring device, as shown in FIGS. 3 and 4, is characterized in that the sheet resistance of the p-type impurity diffused resistors (e.g., 4b and 4d) be 120Ω/□ or more, which is $5 \times 10^{19}$ cm$^{-3}$ or less when the sheet resistance is converted into the surface impurity concentration.

By increasing sheet resistance of p-type impurity, i.e., by decreasing the volume of the impurity injection, it is possible to reduce the influence of the impurity distribution on the sheet resistance value. That is, by reducing the volume of the boron atom injection, it is possible to reduce the strain field of an ion implantation layer itself, resulting in reducing the quantity of boron atoms trapped in the strain field. Consequently, it is possible to reduce the variability of resistance of the p-type impurity diffused resistors (e.g., 4b and 4d). Furthermore, by reducing the volume of the p-type impurity injection, it is possible to reduce strain and microdefects in the semiconductor crystal; therefore, the variability of concentration and quantity of trapped atoms can be also inhibited. As a result, it is possible to reduce the variability of sheet resistance of the p-type impurity diffused resistors.

Figure 19:
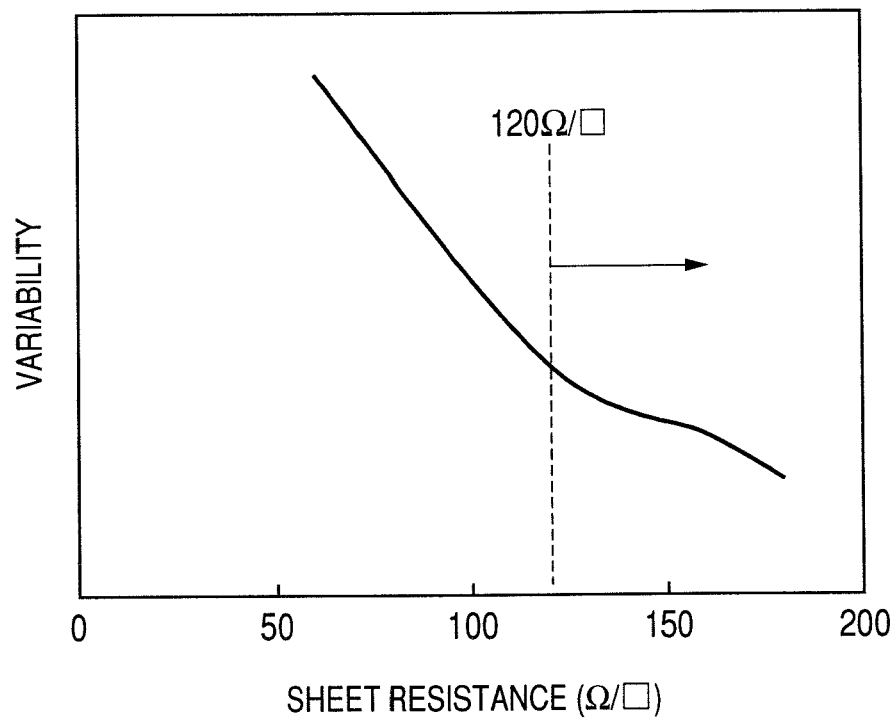
FIG. 19 shows a relationship between nominal sheet resistances of the impurity diffused resistors and variability of the sheet resistance.

FIG. 19 shows a relationship between nominal sheet resistances of the impurity diffused resistors and variability of the sheet resistance. As shown in FIG. 19, when nominal sheet resistance is set at 120Ω/□ or more, the variability range of the sheet resistance is 20% or less. Thus, by setting the nominal sheet resistance at 120Ω/□ or more, the variability of sheet resistance can be inhibited, thereby making it possible to prevent excessive offset. Furthermore, it is desirable that the upper limit of the nominal sheet resistance be 500Ω/□ due to the temperature dependence, which will be described later.

On the other hand, with regard to arsenic or phosphorus atoms comprising n-type impurity diffused resistors, diffusion rate in a semiconductor crystal is remarkably lower than that of boron atoms; and since arsenic and phosphorus atoms have a substitutional diffusion mechanism, they are not easily affected by a strain field. Therefore, n-type impurity diffused resistors are characterized in that they are not easily affected by minute difference of heat treatment temperatures for each lot or wafer.

That is, in the n-type impurity diffused resistor, the variability of resistance value does not increase even if sheet resistance is not increased. On the contrary, if the sheet resistance of the n-type impurity diffused resistors (e.g., 4a and 4c) is increased by the same manner as the p-type impurity diffused resistors, temperature dependence of sensitivity to strain becomes excessive; therefore, it is not desirable to increase the sheet resistance of n-type impurity diffused resistors. Temperature dependence of strain sensitivity of the n-type impurity diffused resistor is significantly greater than that of the p-type impurity diffused resistor; therefore, a measurement error sometimes occurs due to the temperature change. When sheet resistance of n-type impurity diffused resistor is increased, measurement accuracy decreases even more. Therefore, contrary to the p-type impurity diffused resistor, it is desirable that the n-type impurity concentration be increased.

Figure 20:
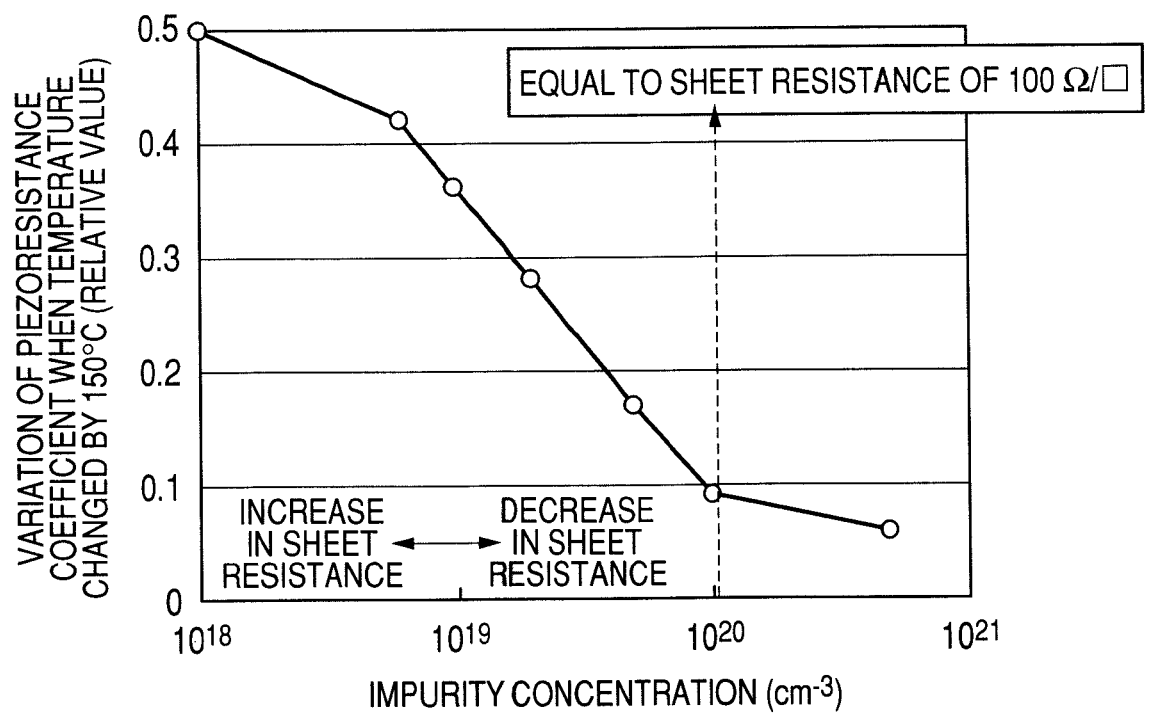
FIG. 20 shows a relationship between impurity concentrations of the impurity diffused resistors and variation of the piezoresistance coefficient when temperature changed by 150° C.

FIG. 20 shows a relationship between impurity concentrations of the impurity diffused resistors and variation of the piezoresistance coefficient when temperature changed by 150° C. As shown in FIG. 20, it is recognized that when sheet resistance increases more than 100Ω/□, temperature dependence of the piezoresistance coefficient rapidly increases. That is, by setting the nominal sheet resistance at 100Ω/□ or less, it is possible to minimize measurement errors due to the temperature change. Sheet resistance of 100Ω/□ or less corresponds to the surface impurity concentration of $1 \times 10^{20}$ cm$^{-3}$ or more. Moreover, when sheet resistance becomes 40Ω/□ or less, the piezoresistance coefficient becomes 20% or less of the maximum value, and that situation is not recommended because sensitivity to strain becomes too small (e.g., the strain sensitivity is easily affected by external noise). Accordingly, it is desirable that sheet resistance of the n-type impurity diffused resistors be 40Ω/□ or more and 100Ω/□ or less.

As stated above, when one bridged circuit is formed by combining p-type and n-type impurity diffused resistors, by setting sheet resistance of the p-type impurity diffused resistors (e.g., 4b and 4d) at 120Ω/□ or more and by setting sheet resistance of the n-type impurity diffused resistors (e.g., 4a and 4c) at 100Ω/□ or less, it is possible to obtain a strain measuring device which can suppress both the variability of sheet resistance resulting from the p-type impurity diffused resistors and the fluctuation of strain sensitivity due to the temperature change resulting from the n-type impurity diffused resistors.

Figure 8:
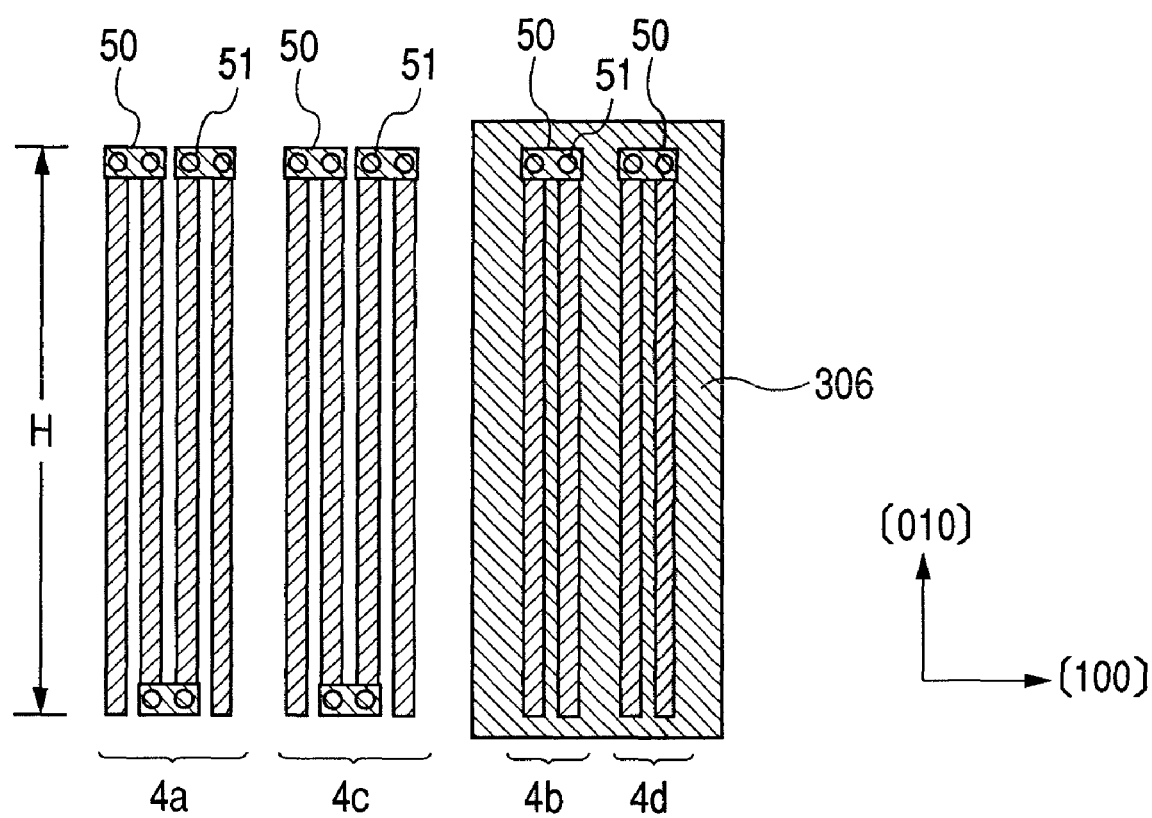
FIG. 8 is a schematic illustration showing another example of the meander shaped resistors comprising strip lines and u-turn portions in a first embodiment of the present invention.

FIG. 8 is a schematic illustration showing another example of the meander shaped resistors comprising strip lines and u-turn portions in a first embodiment of the present invention. As shown in FIG. 8, by reducing the number of strip lines in the p-type impurity diffused resistor, it is possible to reduce the number of locations such as a contact hole 51 in which strain concentrates, thereby making it possible to reduce the variability of the impurity distribution. That is, because the ratio of the area where strain is concentrated to the total area of the p-type impurity diffused resistor can be reduced, it is possible to reduce the variability of the sheet resistance. In the case of the bridged circuit 4 in which p-type impurity diffused resistors and n-type impurity diffused resistors are combined, the number of strip lines in the p-type impurity diffused resistors (4b and 4d) is made smaller than that in the n-type impurity diffused resistors (4a and 4c); and the sheet resistance value of the p-type impurity diffused resistors (4b and 4d) is set at 120Ω/□ or more and the sheet resistance value of the n-type impurity diffused resistors (4a and 4c) is set at 100Ω/☐ or less. By doing so, the variability of sheet resistance of the p-type impurity diffused resistors (4b and 4d) can be reduced thereby inhibiting offset of the bridged circuit 4; and it is also possible to prevent temperature dependence of the strain sensitivity of the bridged circuit 4 from becoming excessive. Accordingly, even when an amplifier or the like amplifies an output from the bridged circuit 4, there is no problem of output saturation, and highly sensitive measurement is possible as the result of high power amplification.

Furthermore, according to the present invention, by turning back strip lines in the n-type impurity diffused resistor so that the number of strip lines is larger than that in the p-type impurity diffused resistor, it is possible to make the length H of the p-type impurity diffused resistor's area (e.g., 4b and 4d) almost the same as that of the n-type impurity diffused resistor's area (e.g., 4a and 4c); therefore, those resistors can be disposed in almost the same position. Accordingly, temperature and strain conditions of the p-type impurity diffused resistors (e.g., 4b and 4d) and the n-type impurity diffused resistors (e.g., 4a and 4c) can be almost the same; consequently, even when an object to be measured has temperature distribution or strain distribution, a measurement error can be prevented. Moreover, herein, it is assumed that the width of each strip line in the p-type impurity diffused resistor be almost the same as that in the n-type impurity diffused resistor.

Furthermore, by setting the injection volume of the p-type impurity and the n-type impurity within a prescribed range in addition to decreasing the number of strip lines in the p-type impurity diffused resistor mentioned above, synergistic effects will cause many advantages; however, even either one procedure has sufficient effects to inhibit offset of the bridged circuit.

Figure 9:
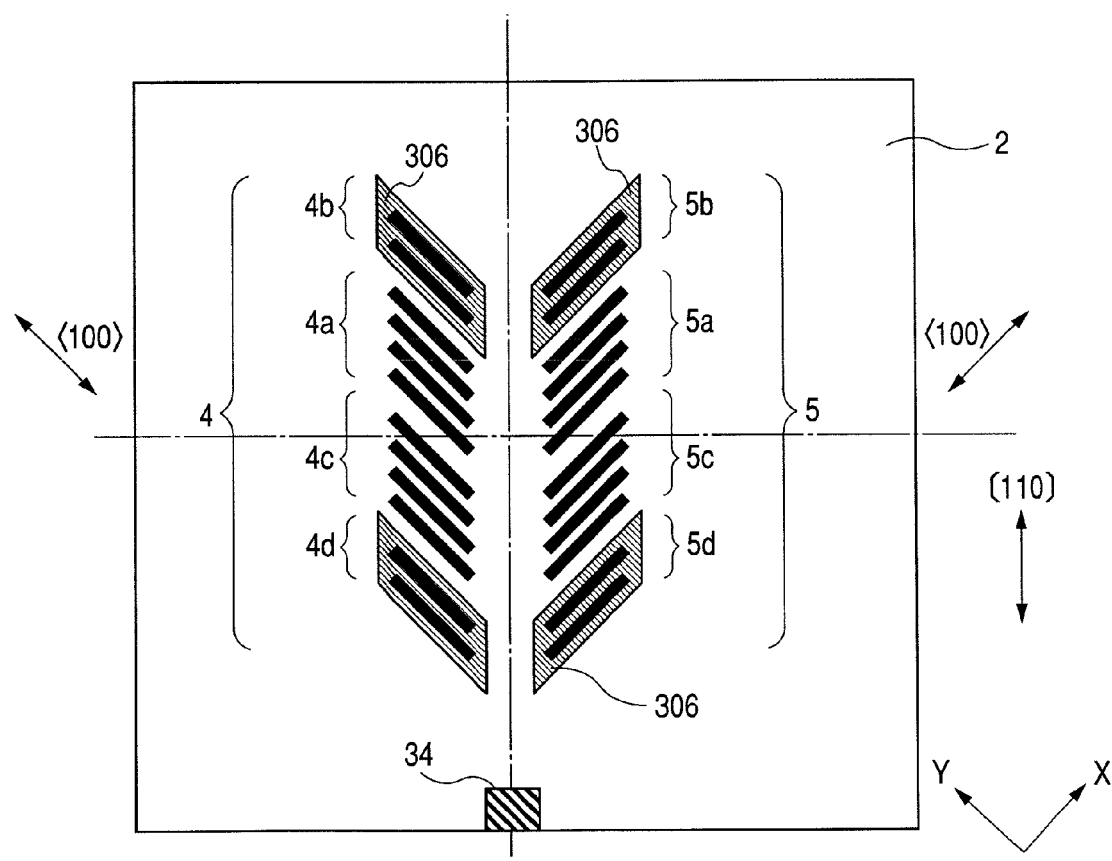
FIG. 9 is a schematic illustration showing another relationship between the impurity diffused resistors and the semiconductor single crystalline substrate in a first embodiment of the present invention.

A bridged circuit 4 has been mainly described so far with reference to FIGS. 6 to 8. FIG. 9 is a schematic illustration showing another relationship between the impurity diffused resistors and the semiconductor single crystalline substrate in a first embodiment of the present invention. As shown in FIG. 9, even when a plurality of bridged circuits are disposed on one silicon substrate 2 so as to measure strain condition in a multiaxial strain field, there are the same advantages aforementioned. Moreover, the total area of a chip can be small, which creates an advantage in that production cost decreases. It is preferable to form the marker 34 on the silicon substrate 2 for identifying the crystal orientation of the substrate since the chip is very small.

Second Embodiment

Figure 10:
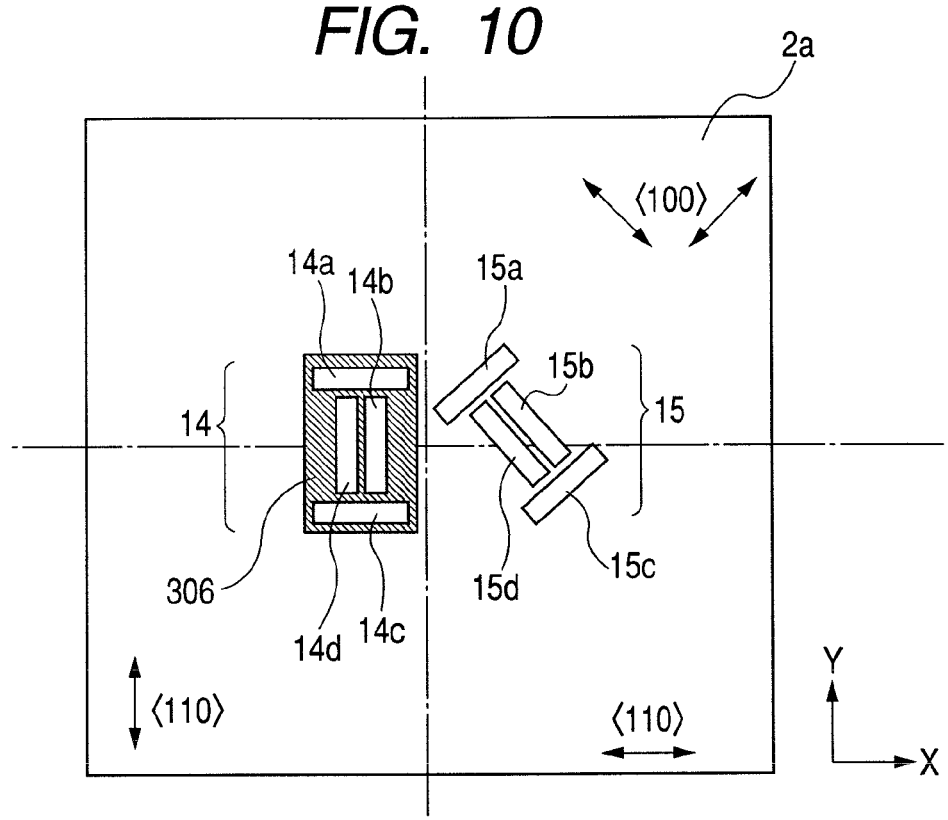
FIG. 10 is a schematic illustration showing a basic relationship between the impurity diffused resistors and the semiconductor single crystalline substrate in a second embodiment of the present invention.
Figure 11:
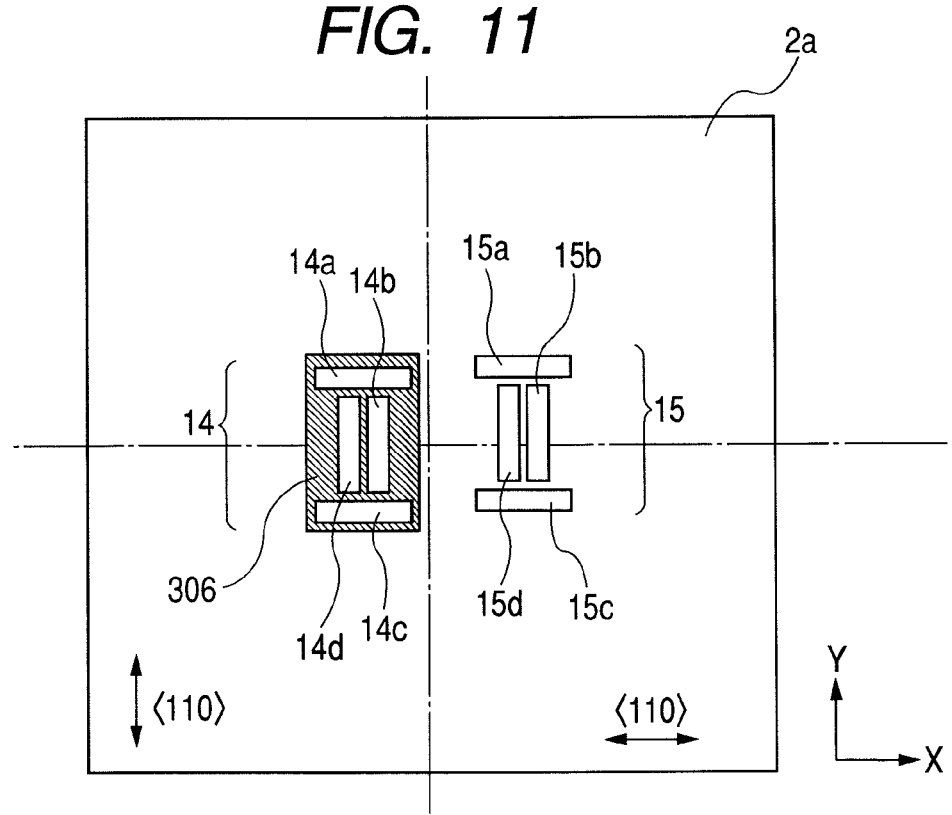
FIG. 11 is a schematic illustration showing another basic relationship between the impurity diffused resistors and the semiconductor single crystalline substrate in a second embodiment of the present invention.

FIG. 10 is a schematic illustration showing a basic relationship between the impurity diffused resistors and the semiconductor single crystalline substrate in a second embodiment of the present invention; and FIG. 11 is a schematic illustration showing another basic relationship between the impurity diffused resistors and the semiconductor single crystalline substrate in a second embodiment of the present invention. As shown in FIGS. 10 and 11, it is possible to measure the strain condition in a multiaxial strain field by using a strain measuring device which includes both a bridged circuit 14 comprising p-type impurity diffused resistors and a bridged circuit 15 comprising n-type impurity diffused resistors in one semiconductor single crystalline substrate. In a strain measuring device shown in FIG. 10, the bridged circuit 14 comprises p-type impurity diffused resistors 14a, 14b, 14c and 14d formed in p-type well 306 in which the current direction is parallel to <110> direction of the substrate 2a; and the bridged circuit 15 comprises n-type impurity diffused resistors 15a, 15b, 15c and 15d in which the current direction is parallel to <100> direction of the substrate 2a. The bridged circuit 14 can measure vertical strain in the <110> direction and the bridged circuit 15 can measure shear strain in the <110> direction.

Furthermore, in a strain measuring device shown in FIG. 11, the bridged circuit 14 also comprises p-type impurity diffused resistors 14a, 14b, 14c and 14d formed in p-type well 306 in which the current direction is parallel to <110> direction of the substrate 2a; and the bridged circuit 15 comprises n-type impurity diffused resistors 15a, 15b, 15c and 15d in which the current direction is parallel to <110> direction of the substrate 2a. By using these two bridged circuits, orthogonal biaxial strain which works [110] and [−110] directions can be separately measured.

In such a strain measuring device according to a second embodiment, because a bridged circuit 14 and a bridged circuit 15 are formed in the same silicon substrate 2a, it is possible to reduce sensitivity error and bonding position error that could occur when the device is installed to an object to be measured, thereby achieving highly accurate measurement. Furthermore, because a bridged circuit that measures strain in each direction can be formed in a very small chip (substrate), there is an advantage in that strain in a stress concentrated field which works in a very small portion can be accurately measured.

However, only the above conditions are insufficient. As stated before, since impurity distribution of the bridged circuit 14 tends to vary for each lot and each wafer, strain sensitivity of the bridged circuit 14 also tends to fluctuate; therefore, it is difficult to execute a highly accurate measurement. That is, when using a strain measuring device in which a bridged circuit comprising p-type impurity diffused resistors and a bridged circuit comprising n-type impurity diffused resistors are disposed in one semiconductor single crystalline substrate so as to separately obtain multiaxial strain from the output of each bridged circuit, strain sensitivity of the bridged circuit comprising p-type impurity diffused resistors tends to fluctuate. This is because sheet resistance of the p-type impurity diffused resistors is easy to change for each wafer and each lot, as mentioned above. Accordingly, when using both the measured value of the bridged circuit comprising p-type impurity diffused resistors and that of the bridged circuit comprising n-type impurity diffused resistors so as to obtain the tensor quantity which indicates the strain condition in the local area, there is a problem in that an calculation error occurs resulting in incorrect measurement if designed resistance values are used. Furthermore, because temperature dependence in the strain sensitivity of the bridged circuit comprising p-type impurity diffused resistors is different from that of the bridged circuit comprising n-type impurity diffused resistors, there is a problem in that a measurement error will occur when the temperature changes.

Figure 12:
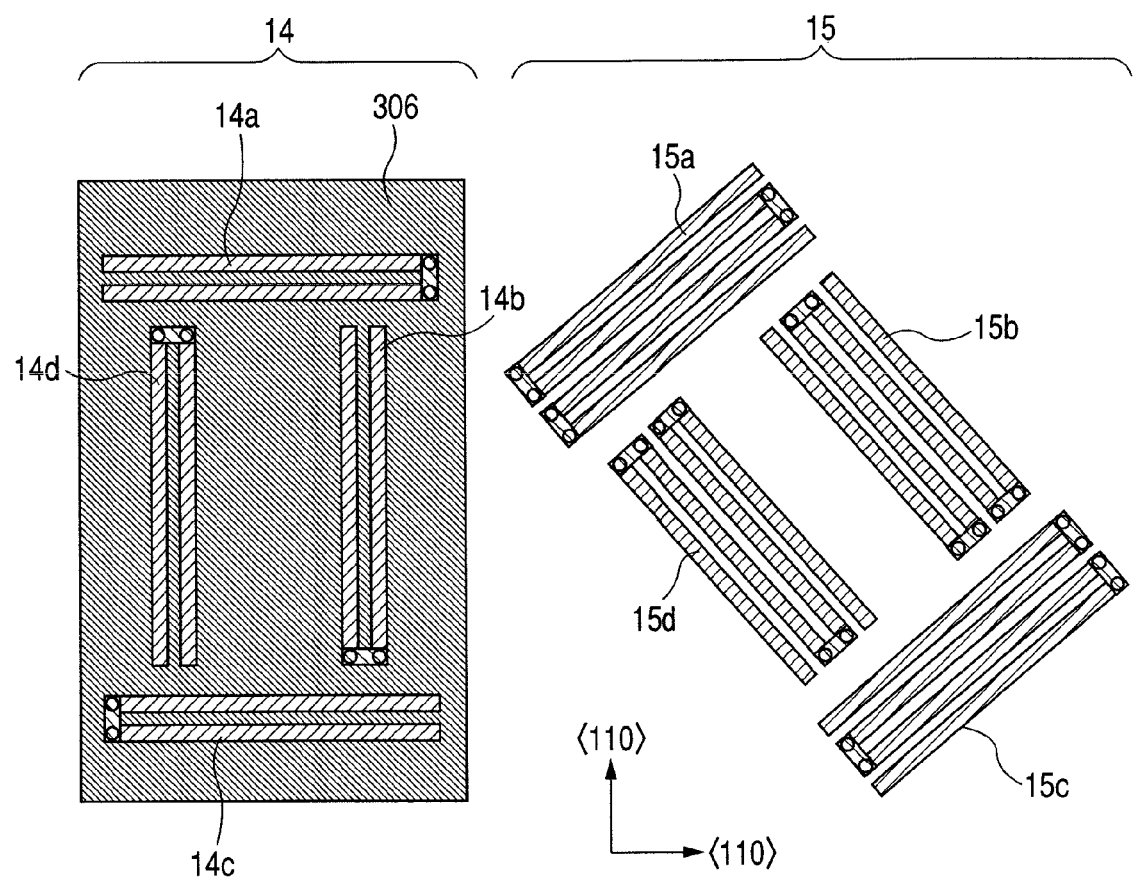
FIG. 12 is a schematic illustration showing a layout example of impurity diffused resistors of FIG. 10.
Figure 13:
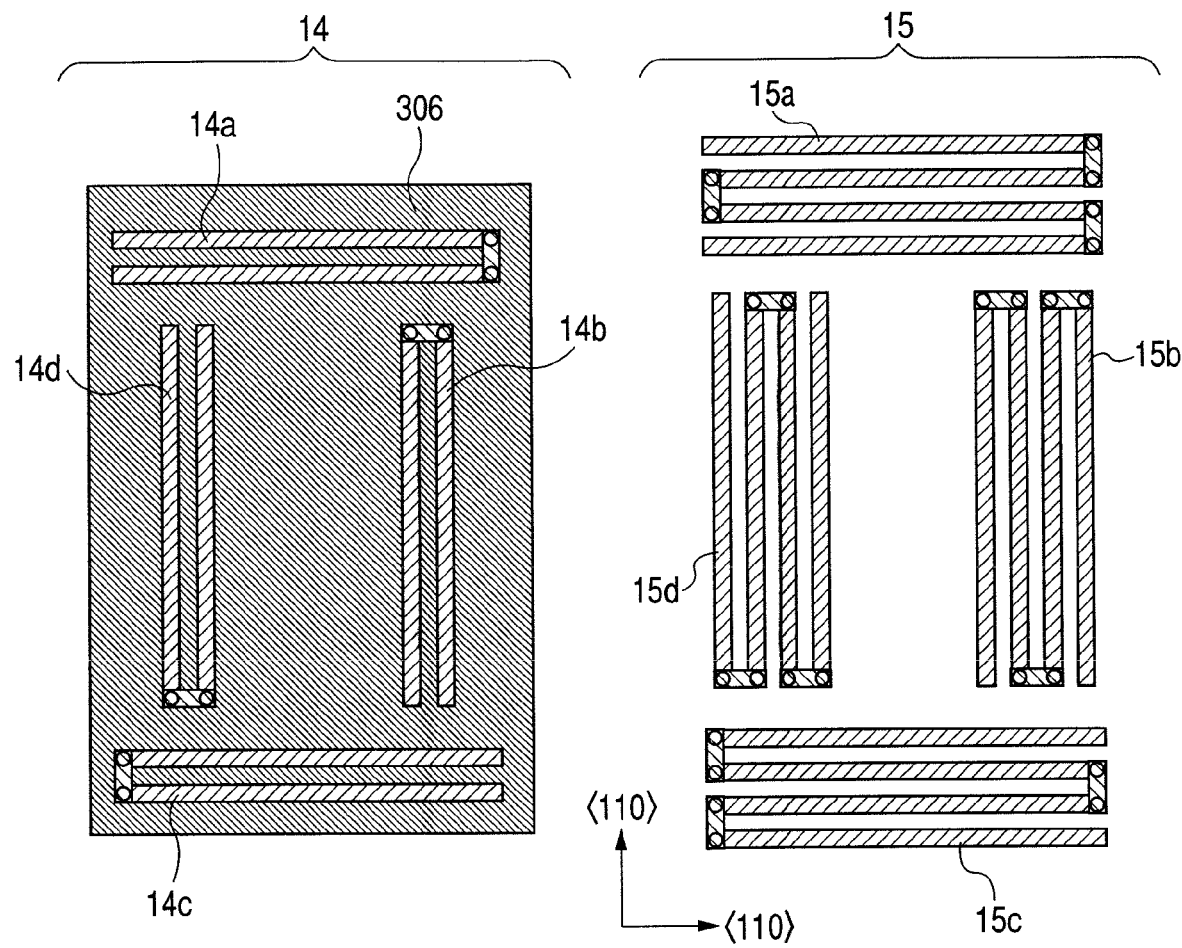
FIG. 13 is a schematic illustration showing a layout example of impurity diffused resistors of FIG. 11.

FIG. 12 is a schematic illustration showing a layout example of impurity diffused resistors of FIG. 10; and FIG. 13 is a schematic illustration showing a layout example of impurity diffused resistors of FIG. 11. FIGS. 12 and 13 show preferred examples of a second embodiment. Although FIGS. 12 and 13 do not show the semiconductor substrate 2a (indicating only crystal directions), in the same manner as shown in FIGS. 10 and 11, a bridged circuit 14 and a bridged circuit 15 are formed at the surface of one semiconductor single crystalline substrate. In this embodiment, in the same manner as the first embodiment, sheet resistance of the p-type impurity diffused resistors (14a, 14b, 14c and 14d) is set at 120Ω/☐ or more, and sheet resistance of the n-type impurity diffused resistors (15a, 15b, 15c and 15d) is set at 100Ω/☐ or less. By doing so, the variability of the impurity distribution of the p-type impurity diffused resistors (14a, 14b, 14c and 14d) can be limited, thereby making it possible to inhibit the variability of the strain sensitivity of the bridged circuit 14.

Furthermore, as shown in FIGS. 12 and 13, the number of strip lines in the p-type impurity diffused resistors (14a, 14b, 14c and 14d) of the bridged circuit 14 is made smaller than that in the n-type impurity diffused resistors (15a, 15b, 15c and 15d) of the bridged circuit 15. By doing so, it is possible to further inhibit the variability of the impurity distribution of the p-type impurity diffused resistors (14a, 14b, 14c and 14d). To explain in more detail, the size of the bridged circuit 14 can become almost the same as that of the bridged circuit 15, and the bridged circuit 14 and the bridged circuit 15 can be disposed adjacently each other; therefore, it is possible to measure the strain under the same condition.

As stated above, the variability of sheet resistance of the p-type impurity diffused resistors can be reduced and the size of the n-type impurity diffused resistors can become small; consequently, it is possible to suppress the variability as well as to prevent measurement accuracy from decreasing. According to this embodiment, strain condition of the bridged circuit 15 can become the same as that of the bridged circuit 14. As a result, even when measuring an object that has strain distribution or temperature distribution, multiaxial strain can be easily measured.

On the other hand, temperature dependence of strain sensitivity of the p-type impurity diffused resistors is different from that of the n-type impurity diffused resistors. Therefore, when temperature of the object to be measured largely changes, there is a concern that a measurement error may occur.

Figure 14:
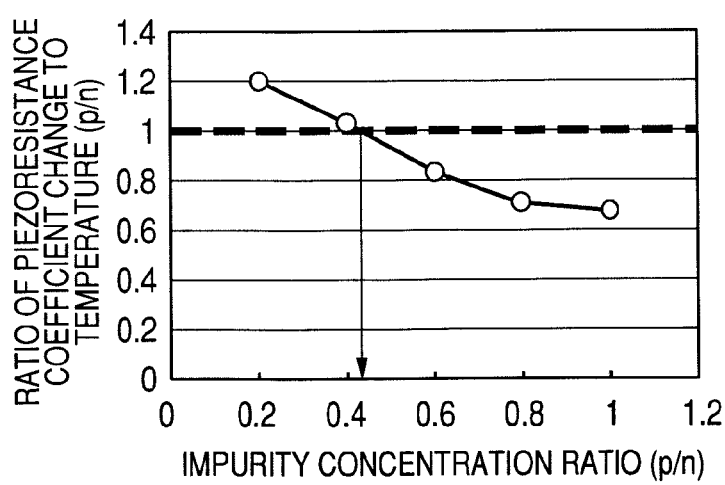
FIG. 14 shows a relationship between the ratio of p-type and n-type impurity concentration and the ratio of the piezoresistance coefficient change rate in relation to changes in temperature.

FIG. 14 shows a relationship between the ratio of p-type and n-type impurity concentration and the ratio of the piezoresistance coefficient change rate in relation to changes in temperature. As shown in FIG. 14, by setting a ratio of the p-type impurity concentration to the n-type impurity concentration within a range of 20 to 60%, most preferably by setting the ratio of 43% as a center value, it is possible to almost equalize the change rates of piezoresistance coefficient of the n-type impurity diffused resistor and the p-type impurity diffused resistor within 20% in relation to changes in temperature. When those impurity concentration values are converted into sheet resistance values, a ratio of sheet resistance of the p-type impurity to that of the n-type impurity is 1.67 to 5. Furthermore, it is desirable that sheet resistance of the p-type impurity diffused resistors (14a, 14b, 14c and 14d) be set at 120Ω/☐ or more (preferably 120 to 500Ω/☐) and sheet resistance of the n-type impurity diffused resistors (15a, 15b, 15c and 15d) be set at 100Ω/☐ or less (preferably 40 to 100Ω/☐) and the sheet resistance satisfy the above-mentioned ratio. For example, when the sheet resistance of the n-type impurity diffused resistors is nearly 80Ω/☐, it is desirable that the sheet resistance of the p-type impurity diffused resistor be within a range of 134 to 400Ω/☐. By using a strain measuring device (e.g., shown in FIGS. 10 and 13) so that the sheet resistance is within the above-mentioned range, it is possible to accurately measure multiaxial strain even when temperature has changed.

In this embodiment, description was made about the case in which two bridged circuits are formed in one silicon substrate 2a. Naturally, the same effect can be obtained even when more bridged circuits are formed.

Furthermore, as stated above, by reducing the injection volume of the p-type impurity to increase sheet resistance in addition to decreasing the number of strip lines in the p-type impurity diffused resistor, synergistic effects will create many advantages. However, even using either one of the procedures has a sufficient effect to inhibit offset of the bridged circuit.

Third Embodiment

In the related art described in JP-A-2006-003182, a circuit design is made so that resistance values of four impurity diffused resistors are equal to each other and the bridged circuit counterbalances. However, when the device is actually fabricated, resistance values of the four impurity diffused resistors are often slightly different from a nominal value, which may cause a slight offset. Therefore, a third embodiment of the present invention provides a strain measuring device in which resistance values of the four impurity diffused resistors comprising a bridged circuit are equal to each other and almost no offset is generated.

Figure 15:
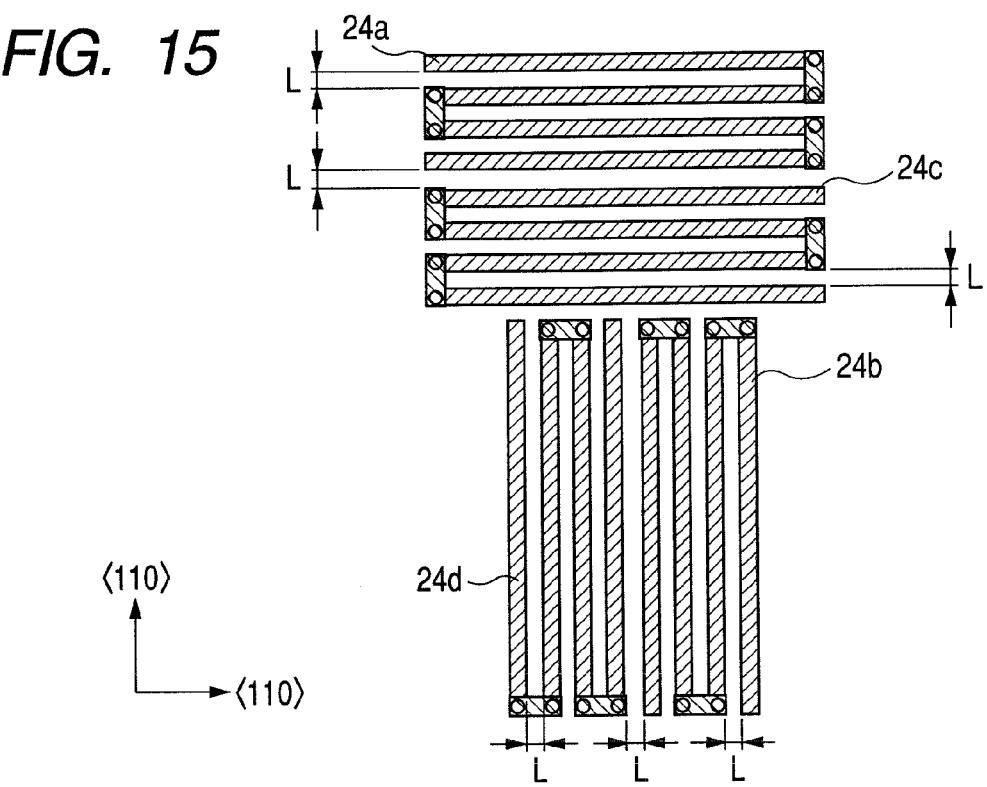
FIG. 15 is a schematic illustration showing a layout example of impurity diffused resistors in a third embodiment of the present invention.

FIG. 15 is a schematic illustration showing a layout example of impurity diffused resistors in a third embodiment of the present invention. As shown in FIG. 15, p-type impurity diffused resistors 24a and 24c that constitute a pair of opposite arms of a bridged circuit are arranged lengthwise, and p-type impurity diffused resistors 24b and 24d that constitute the other pair of opposite arms of the bridged circuit are disposed in adjacent to each other. Furthermore, each interval of strip lines constituting a p-type impurity diffused resistor 24a and constituting a p-type impurity diffused resistor 24c is expressed as L; each interval of strip lines constituting a p-type impurity diffused resistor 24b and constituting a p-type impurity diffused resistor 24d is also expressed as L; and the distance between the p-type impurity diffused resistors 24a and 24c and the distance between the p-type impurity diffused resistors 24b and 24d are also expressed as L. Thus, by making each interval between strip lines constant and also making the interval between the p-type impurity diffused resistors constant, it is possible to make the stress of each strip line (i.e., impurity diffused resistor) almost identical. Accordingly, impurity diffusion rate of the boron atom, the degree of electrical activity, and the degree of atomic trapping can be made identical. That is, it is possible to increase uniformity of each impurity diffused resistor. By doing so, resistance values of p-type impurity diffused resistors 24a, 24b, 24c and 24d can be accurately matched, therefore, it is possible to prevent offset of the bridged circuit from occurring. On the other hand, as seen in a conventional device, when strip line patterns (i.e., impurity diffused resistors) are not aligned with a constant interval, the variability of impurity distribution tends to become large because boron atoms diffuse faster than n-type impurity atoms in the semiconductor crystal. Thus, this embodiment is highly effective in reducing the variability of sheet resistance of the p-type impurity diffused resistors. Although, in FIG. 15, a bridged circuit comprising p-type impurity diffused resistors is shown as an example, by applying this embodiment to a bridged circuit comprising n-type impurity diffused resistors, ion implantation conditions of the n-type impurity can be also made uniform and the same effects can be obtained.

Figure 16:
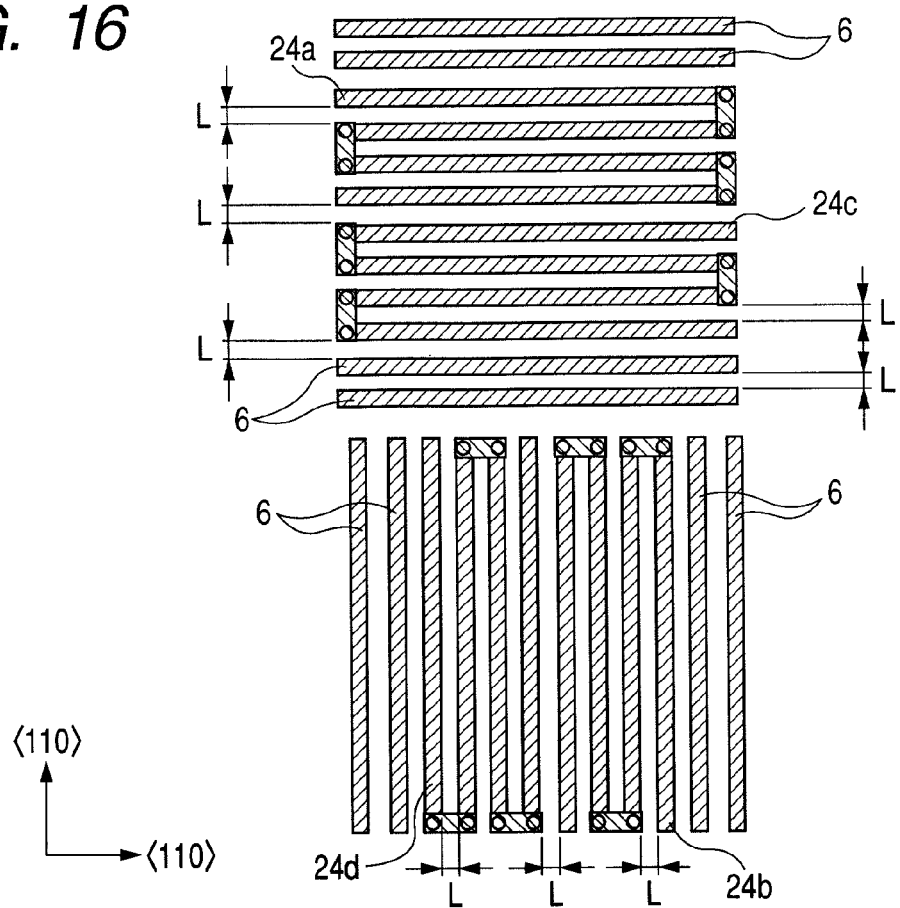
FIG. 16 is a schematic illustration showing another layout example of impurity diffused resistors in a third embodiment of the present invention.

FIG. 16 is a schematic illustration showing another layout example of impurity diffused resistors in a third embodiment of the present invention. As shown in FIG. 16, it is possible to provide a dummy strip line 6, which is not electrically connected to a bridged circuit, at an end portion of the p-type impurity diffused resistors 24a and 24c and at an end portion of the p-type impurity diffused resistors 24b and 24d. It is desirable that the interval between the dummy strip line 6 and each impurity diffused resistor 24a to 24d be L and the interval between dummy strip lines 6 also be L. That is, a plurality of strip lines are disposed in the same direction with interval L being constant, and some of them are electrically connected to form impurity diffused resistors of the bridged circuit, and the others are used as dummy strip lines. It is desirable that among strip lines the dummy strip lines are disposed outside the impurity diffused resistors constituting a bridged circuit. In this case, stress around each impurity diffused resistor can be made more uniform; consequently, it is possible for the impurity diffused resistor to further reduce the variability of impurity distribution.

Figure 17:
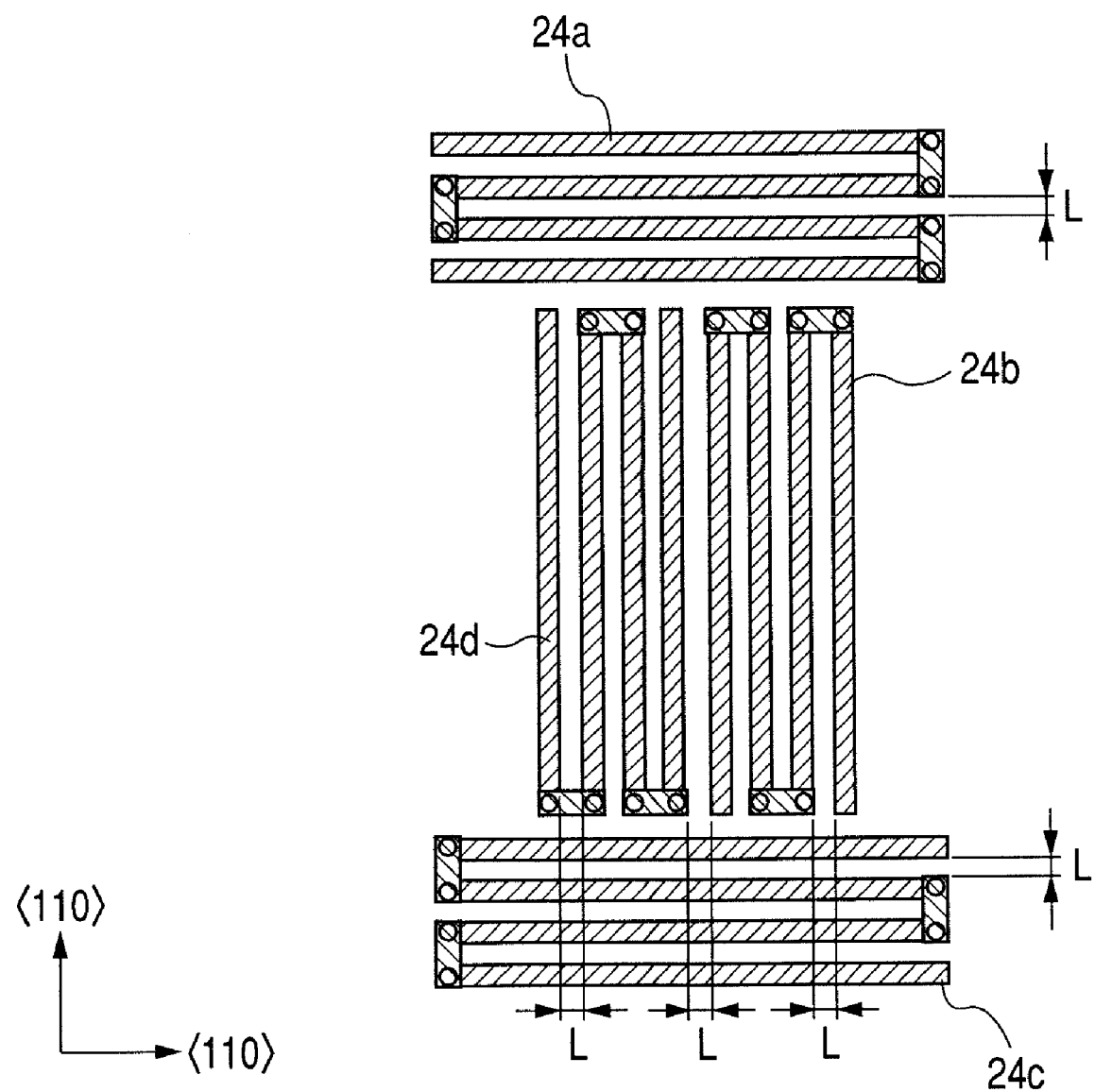
FIG. 17 is a schematic illustration showing another layout example of impurity diffused resistors in a third embodiment of the present invention.
Figure 18:
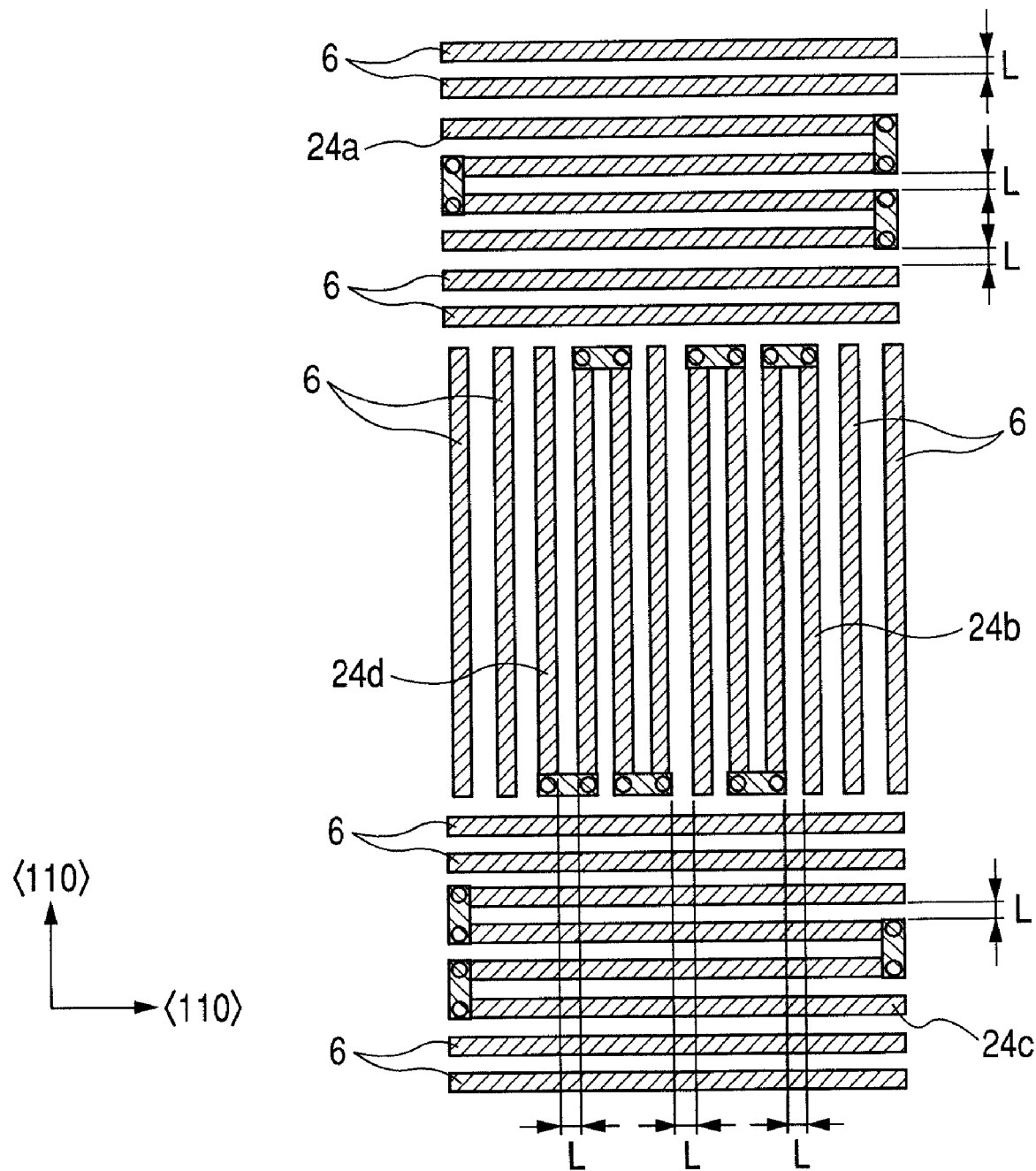
FIG. 18 is a schematic illustration showing another layout example of impurity diffused resistors in a third embodiment of the present invention.

FIG. 17 is a schematic illustration showing another layout example of impurity diffused resistors in a third embodiment of the present invention; and FIG. 18 is a schematic illustration showing another layout example of impurity diffused resistors in a third embodiment of the present invention. As shown in FIG. 17, by making the interval between the p-type impurity diffused resistors 24*b* and 24*d* equal to L, it is possible to make resistance values of p-type impurity diffused resistors 24*b* and 24*d* accurately identical. Although this configuration may not be as excellent as the configuration shown in FIG. 16, it is possible to reduce offset of the bridged circuit from occurring. Furthermore, as shown in FIG. 18, dummy strip lines 6 can be disposed on both sides of the impurity diffused resistors 24*a* and 24*c* in addition to outside of the impurity diffused resistors 24*b* and 24*d*.

In the same manner, although not shown here, it is possible to apply this embodiment to the bridged circuit comprising p-type impurity diffused resistors and n-type impurity diffused resistors, which are disposed in the same direction as shown in FIGS. 8 and 9. That is, a plurality of strip lines are disposed with a constant interval L; some of them are connected to form an impurity diffused resistor which constitutes a bridged circuit; and dummy strip lines 6 containing the same type impurity as the impurity diffused resistor can be provided near the impurity diffused resistor.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A strain measuring device, comprising:
   a semiconductor single crystalline substrate including a strain detecting portion configured to perform strain measurement, the strain detecting portion comprising a bridge circuit, and the bridge circuit comprising an impurity diffused resistor; wherein:
   the impurity diffused resistor constituting one arm of the bridge circuit is configured to be in a meander shape comprising strip lines and connecting portions;
   each interval between the strip lines in the meander shaped impurity diffused resistor is substantially constant; and
   distance between said impurity diffused resistor constituting one arm of the bridge circuit and another impurity diffused resistor constituting another arm of the bridge circuit is substantially equal to the substantially constant interval between each of the strip lines.

2. The strain measuring device according to claim 1, wherein:
   said one arm of the bridge circuit comprising the impurity diffused resistor and said another arm of the bridge circuit comprising the impurity diffused resistor constitute a pair of opposite arms of the bridge circuit.

3. The strain measuring device according to claim 1, wherein:
   the strain detective portion includes two bridged circuits, one bridged circuit comprising p-type impurity diffused resistors and the other bridged circuit comprising n-type impurity diffused resistors; and
   the impurity diffused resistors constituting a pair of opposite arms of each bridged circuit are adjacent with one another.

4. A strain measuring device, comprising:
   a semiconductor single crystalline substrate including a strain detecting portion configured to perform strain measurement, the strain detecting portion comprising a bridge circuit, and the bridge circuit comprising an impurity diffused resistor; wherein:
   the impurity diffused resistor constituting one arm of the bridge circuit is configured to be in a meander shape comprising strip lines and connecting portions;
   each interval between the strip lines in the meander shaped impurity diffused resistor is substantially constant;
   distance between said impurity diffused resistor constituting one arm of the bridge circuit and another impurity diffused resistor constituting another arm of the bridge circuit is substantially equal to the substantially constant interval between each of the strip lines;
   a dummy strip line not constituting a bridge circuit is disposed adjacent the meander shaped impurity diffused resistor; and
   distance between the dummy strip line and the meander shaped impurity diffused resistor is substantially equal to the substantially constant interval between each of the strip lines.

5. The strain measuring device according to claim 4, wherein:
   the strain detective portion includes two bridged circuits, one bridged circuit comprising p-type impurity diffused resistors and the other bridged circuit comprising n-type impurity diffused resistors; and
   the impurity diffused resistors constituting a pair of opposite arms of each bridged circuit are adjacent with one another.

\* \* \* \* \*